(12) United States Patent
Xue

(10) Patent No.: US 9,415,360 B2
(45) Date of Patent: Aug. 16, 2016

(54) ON-SITE MIXED LOADING TRUCK FOR EXPLOSIVES WITH DIFFERENT DETONATION VELOCITIES

(71) Applicant: Qingdao Target Mining Services Co., Ltd, Qingdao, Shandong (CN)

(72) Inventor: Shizhong Xue, Weihai (CN)

(73) Assignee: Qingdao Target Mining Services Co., Ltd., Qingdao, Shandong (CN)

( * ) Notice: Subject to any disclaimer, the term of this patent is extended or adjusted under 35 U.S.C. 154(b) by 227 days.

(21) Appl. No.: 14/370,943

(22) PCT Filed: Oct. 18, 2012

(86) PCT No.: PCT/CN2012/083123
§ 371 (c)(1),
(2) Date: Sep. 4, 2014

(87) PCT Pub. No.: WO2013/102365
PCT Pub. Date: Jul. 11, 2013

(65) Prior Publication Data
US 2015/0003186 A1    Jan. 1, 2015

(30) Foreign Application Priority Data
Jan. 5, 2012   (CN) .......................... 2012 1 0002165

(51) Int. Cl.
*C06B 21/00* (2006.01)
*F42D 1/10* (2006.01)
(Continued)

(52) U.S. Cl.
CPC ............... *B01F 15/0251* (2013.01); *B60P 3/24* (2013.01); *C06B 21/0008* (2013.01);
(Continued)

(58) Field of Classification Search
CPC ............. B01F 13/10; B01F 2215/0057; B01F 15/0251; B01F 2015/0204; B60P 3/24; C06B 21/0008; F42B 99/00; F42D 1/10
See application file for complete search history.

(56) References Cited

U.S. PATENT DOCUMENTS

| 3,690,213 A | * | 9/1972 | Grant | ...................... C06B 21/00 86/1.1 |
| 4,102,240 A | * | 7/1978 | Cook | .................... B01F 3/0807 149/109.6 |
| 4,195,548 A | * | 4/1980 | Cook | .................... B01F 3/0807 149/109.6 |

(Continued)

FOREIGN PATENT DOCUMENTS

| CN | 101219917 A | 7/2008 |
| CN | 201527239 U | 7/2010 |

(Continued)

OTHER PUBLICATIONS

Xue, International Search Report, PCT/CN2012/083123, Jan. 31, 2013, 4 pgs.

*Primary Examiner* — Tony G Soohoo
(74) *Attorney, Agent, or Firm* — Morgan, Lewis & Bockius LLP

(57) ABSTRACT

Provided is a site vehicle for mixing and loading multiple kinds of explosives with different detonation velocities. The vehicle contains a double-helix conveying system, a plurality of storage bins (5-8) and multiple sets of pipelines. Emulsified bases, porous granular ammonium nitrate and physical density modifier are stored in the main material storage bins, an adjuvant storage bin is provided with a diesel tank (4, 31), a sensitizing solution tank (40) and a washing water tank (11), and the technical effect that multiple kinds of explosives with different detonation velocities are mixed and loaded can be realized by using the different combinations of the different raw materials of the storage bins and various output pipelines and some baffle plates. The vehicle has the advantages of multiple purposes, capability of producing heavy emulsion explosive, density-modifiable heavy emulsion explosive, low density emulsion explosive, ultra-low density emulsion explosive, heavy ammonium nitrate fuel oil explosive, density-modifiable ammonium nitrate fuel oil explosive, porous granular ammonium nitrate fuel oil explosive, density-modifiable porous granular ammonium nitrate fuel oil explosive, and minor-diameter and long-distance conveying emulsion explosive, and applicability to the needs of various blasting operation environments and loading different kinds of explosives in the same blast hole.

15 Claims, 2 Drawing Sheets

(51) Int. Cl.
 *F42D 1/00* (2006.01)
 *B01F 13/00* (2006.01)
 *B01F 13/10* (2006.01)
 *B01F 15/02* (2006.01)
 *B60P 3/24* (2006.01)
 *F42B 99/00* (2006.01)
 *C06B 23/00* (2006.01)

(52) U.S. Cl.
 CPC .............. *C06B 23/003* (2013.01); *F42B 99/00* (2013.01); *F42D 1/10* (2013.01); *B01F 13/10* (2013.01); *B01F 2015/0204* (2013.01); *B01F 2215/0057* (2013.01)

(56) References Cited

U.S. PATENT DOCUMENTS

| | | | | |
|---|---|---|---|---|
| 4,610,714 A | * | 9/1986 | Harbolt | B01F 1/00 71/28 |
| 4,614,146 A | * | 9/1986 | Ross | B01F 3/1221 102/313 |
| 4,685,375 A | * | 8/1987 | Ross | B01F 3/1221 149/109.6 |
| 5,156,779 A | * | 10/1992 | McGowan | B01F 5/0405 149/109.6 |
| 5,811,711 A | * | 9/1998 | Tremblay | F42D 1/10 86/20.15 |
| 7,971,534 B2 | * | 7/2011 | Waldock | F42D 1/10 102/313 |
| 9,170,081 B2 | * | 10/2015 | Rudinec | F42D 1/10 |
| 2010/0327011 A1 | * | 12/2010 | Rancourt | C06B 21/0008 86/20.15 |

FOREIGN PATENT DOCUMENTS

| | | |
|---|---|---|
| CN | 202390344 U | 8/2012 |
| CN | 202415397 U | 9/2012 |
| EP | 0203230 A1 | 12/1986 |
| JP | 2004232985 A | 8/2004 |

\* cited by examiner

ON-SITE MIXED LOADING TRUCK FOR EXPLOSIVES WITH DIFFERENT DETONATION VELOCITIES

CROSS REFERENCE TO RELATED APPLICATIONS

This application is a United States National Stage Application filed under 35 U.S.C. §371 of PCT Patent Application Ser. No. PCT/CN2012/083123 filed on Oct. 18, 2012, which claims the benefit of and priority to Chinese Patent Application No. 201210002165.3 filed on Jan. 5, 2012, which are hereby incorporated by reference in their entireties.

The application claims priority of the following Chinese patent application:

1. Chinese patent application No. 201210002165.3, filed with Chinese Patent Office on Jan. 5, 2012, entitled "Multifunctional On-Site Mixed Loading Truck for Emulsion Ammonium Nitrate Fuel Oil Explosive".

FIELD OF THE INVENTION

The application relates to a mixed loading truck for explosives and particularly relates to an on-site mixed loading truck for explosives with different detonation velocities.

BACKGROUND OF THE INVENTION

A porous granular ammonium nitrate fuel oil explosive is an on-site mixed-loaded bulk explosive obtained by mixing porous granular ammonium nitrate and diesel according to the proportion of 94.5:5.5, has the characteristics of rich raw materials, simplicity in processing, low manufacturing cost, good fluxion property, safety in use, large gas energy and appropriate detonation velocity and is widely applied in open-pit mining blasting operations.

In spite of low cost, the porous granular ammonium nitrate fuel oil explosive is non-water-proof and non-moisture-proof, so it is suitable for regions with drought and little rain, and needs to perform moisture-proof treatment for construction in rainy seasons and mining areas with rich groundwater, as well as water-containing blast holes and moist blast holes; and furthermore, the relative volume energy and the weight energy are relatively low, so it is not particularly suitable for blasting hard rocks.

The porous granular ammonium nitrate fuel oil explosive is generally mixed by the on-site mixed loading truck for the porous granular ammonium nitrate fuel oil explosive and directly loaded into the blast hole, when a small amount of water is contained in the blast hole, one method is that, the blast hole is lined with a plastic bag, and then loaded with the explosive, but the method can not realize coupling loading; and another method is that, water in the blast hole is firstly drained, including blasting drainage, water pumping and the like, and then the explosive is loaded, but the method may enable the follow-up incoming water in the blast hole to dissolve ammonium nitrate and cause the failure of the explosive because the blast hole is connected with a nearby groundwater source.

An emulsion explosive has the characteristics of good waterproof performance, strong waterproof capability, large relative volume energy, high density and high detonation velocity, but the density-modifiable range is small, the explosion performance is stable between 1.05 and 1.35 g/cm$^3$, and the emulsion explosive is suitable for blasting rocks above medium hardness; and the emulsion explosive has the shortcomings of high manufacturing cost, high density and high unit consumption of the explosive, the emulsion explosive needs to be loaded section by section when being packaged and can not realize coupling loading, and the on-site mixed-loaded emulsion explosive generally adopts an on-site mixed loading truck for emulsion explosives to realize the loading of the emulsion explosive.

In blasting construction of a mine, due to the influence of complex and changeable environmental conditions, including variable rock hardness conditions, presplitting blasting requirements, construction in rainy seasons, rock joints and other various conditions, if the existing on-site mixed-loaded ammonium nitrate fuel oil explosive or the emulsion explosive is adopted, it is very difficult to consider the blasting effect while keeping the unit consumption of the explosive unchanged.

SUMMARY OF THE INVENTION

The invention aims at providing an on-site mixed loading truck for explosives with different detonation velocities. A porous granular emulsion ammonium nitrate fuel oil explosive integrates the advantages of an emulsion explosive and a porous granular ammonium nitrate fuel oil explosive, also overcomes the disadvantages and shortcomings of the existing emulsion explosive; while retaining the good properties of the porous granular ammonium nitrate fuel oil explosive, it also overcomes the defects of poor moisture-proof and waterproof performances of the ammonium nitrate fuel oil explosive, simultaneously overcomes the shortcomings of high density and high unit explosive consumption of the emulsion explosive, and solves predicament of poor density modification performance of the emulsion explosive. The on-site mixed loading truck for the emulsion ammonium nitrate fuel oil explosive of the invention can provide a large range of emulsion explosive density modification and realize the on-site mixed loading truck for explosives with different densities and different detonation velocities.

The technical solution disclosed by the invention is as follows:

An on-site mixed loading truck for explosives with different detonation velocities comprises a truck body and a chassis, and further comprises a main bin system, an auxiliary bin system, a double-helix conveying and mixing system and a control system, as well as a main explosive conveying coil, an auxiliary plunger linkage pump and an auxiliary explosive conveying coil, wherein the main bin system comprises an emulsion base bin, an ammonium nitrate bin and a physical density modifier bin, the auxiliary bin system comprises diesel tanks, a sensitizing solution tank and a process water and washing water tank, the diesel tanks are provided with diesel pumps; the emulsion base bin is provided with an emulsion base pump; the sensitizing solution tank is provided with a sensitizing solution pump; the double-helix conveying and mixing system comprises main helix conveyors, an inclined helix conveyor and a mixing side helix conveyor, which are sequentially arranged; the main helix conveyors at least include a main helix conveyor A and a main helix conveyor B; an inlet end of the main helix conveyor A is connected with the bottom of the ammonium nitrate bin; an inlet end of the main helix conveyor B is connected with the bottom of the density modifier bin; the main helix conveyor A and the main helix conveyor B are connected with the inclined helix conveyor, the mixing side helix conveyor and a mixing hopper successively; an outlet end of the mixing side helix conveyor is directly sequentially connected with the mixing hopper;

and an outlet end of the mixing hopper is connected with a product pump, a water ring injection device and the main explosive conveying coil.

Optionally, the main helix conveyor A and the main helix conveyor B are both mounted below a material tank of the mixed loading truck and used for respectively conveying porous granular ammonium nitrate and/or a density modifier.

Optionally, the main helix conveyor B is provided with a speed regulating device, by means of which the rotational speed of the main helix conveyor B is regulated, and in turn the output speed of the physical density modifier is regulated, to achieve the purpose of regulating different densities.

Optionally, baffle plates for controlling the bins to discharge or not to discharge are arranged at the joints of the emulsion base bin, the ammonium nitrate bin and the density modifier bin with the main helix conveyor, and opening of each baffle plate is controlled manually or controlled through the control system.

Optionally, the baffle plates are material flow direction baffle plates for controlling materials to respectively flow to a main material conveying helix A or B.

Optionally, the emulsion base bin is used for storing and loading the ammonium nitrate or the density modifier, and outputting the ammonium nitrate or the density modifier through the material flow direction baffle plates mounted at the bottom, in producing an ammonium nitrate fuel oil explosive or a density-modifiable heavy ammonium nitrate fuel oil explosive.

Optionally, output pipelines of an emulsion base and a sensitizing solution comprise the two lines: one line comprises the auxiliary plunger linkage pump, a water ring injector, the auxiliary explosive conveying coil and a static mixer, which are sequentially connected; and the other line comprises an emulsion base screw pump for pumping the emulsion base and the sensitizing solution pump; the emulsion base screw pump and the sensitizing solution pump are respectively connected with the lower end of a vertical outlet section of the inclined helix conveyor through pipelines; the sensitizing solution tank at least comprises three relatively independent sensitizing solution tanks for respectively providing the different concentrations of sensitizing solution, and one or two of the sensitizing solution tanks is/are used for providing the sensitizing solution through the auxiliary plunger linkage pump.

Optionally, the mixed loading truck for explosives is further provided with a power takeoff hydraulic oil loop control system, which comprises a power takeoff connected with a gearbox of the truck body, a transmission rod, a hydraulic pump, a hydraulic oil splitter, a hydraulic oil cooler, a hydraulic oil filter, a hydraulic oil tank, a pressure gauge, a thermometer, a hydraulic pipeline and other hydraulic system components.

Optionally, the diesel tanks and the output pipelines are connected with the upper end of the vertical outlet section of the inclined helix conveyor through pipelines and spouts.

Optionally, a vertical helix conveying section/sections is/are arranged at one end or two ends of the inclined helix conveyor. The control system comprises an automobile power takeoff hydraulic oil loop control system, a pump flow control system, a material output control system, an equipment switch control system, a programmable controller, a mixing proportion control system, an electric potential control system, a bulk explosive information processing system, a bulk explosive monitoring system and a control panel.

Optionally, heat insulation layers/a heat insulation layer are/is arranged on the inner side and/or the outer side of the wall of the emulsion base bin.

Optionally, the mixed loading truck for explosives further comprises a process water and washing water system, and the process water and washing water system comprises a water tank and a water pump.

Optionally, the mixing hopper is a temporary storage tank which is used before the explosives are loaded to the bottom of a blast hole in production of a heavy emulsion explosive or a low density emulsion explosive, and the stored explosives are pumped through the product pump and further loaded to the bottom of the blast hole through the water ring injection device and the main explosive conveying coil.

Optionally, the mixing side helix conveyor rotates horizontally, an explosive product after mixing is directly loaded into the blast hole, and the mixing side helix conveyor is mounted on one side of a driver or at the top of a compartment.

Optionally, the truck further comprises the auxiliary plunger linkage pump and the auxiliary explosive conveying coil for loading the pure emulsion explosive, wherein the diameter of a hose of the auxiliary explosive conveying coil is less than 32 mm.

Optionally, the water ring injection device forms a water ring on the outer side of an explosive column in an explosive conveying pipe when the explosives are injected to the bottom of the hole by using the main explosive conveying coil.

Optionally, the emulsion base, also known as a latex base, is prepared by emulsifying a salt water solution of an oxidizer and an oil phase material by an emulsifier, and the sensitizing solution is prepared by mixing a chemical sensitizing agent and water.

Optionally, the ammonium nitrate is porous granular ammonium nitrate, the physical density modifier is particles prepared by a thermoplastic polymer, such as polystyrene particles or coarse perlite particles or plant seed particles or plant seed husks. Preferably, the particle size is 1-3 mm, and the bulk density is 0.01-0.2 $g/cm^3$.

The invention has the following technical effects:

By providing a plurality of bins on the truck body of the on-site mixed loading truck for explosives with different detonation velocities, the emulsion base, the ammonium nitrate, the physical density modifier, diesel, the sensitizing agent, the process water and the washing water can be respectively stored in the bins, and the conveying and mixing system comprises the main helix conveyor, the inclined helix conveyor and the mixing helix conveyor, wherein the main helix conveyors at least include the main helix conveyor A for connecting and conveying the ammonium nitrate material and the main helix conveyor B for connecting and conveying the physical density modifier material, respectively.

In addition, in the invention, on the one hand, the purpose of direct on-site mixed loading of the emulsion explosive is achieved by directly connecting with the water ring injector, the auxiliary explosive conveying hose and the static mixer through the base pump and the sensitizing solution pump; on the other hand, the emulsion base and the sensitizing solution are directly conveyed to a vertical output section of the inclined helix conveyor through pipelines of another base pump and the sensitizing solution pump, and after subjected to mixing side helix mixing, the emulsion base and the sensitizing solution are directly conveyed into the mixing hopper, and the explosives are sent into the bottom of the blast hole via the product pump, the water ring injector and the main explosive conveying coil.

In the on-site mixed loading truck for explosives with different detonation velocities of the invention, the technical purpose of on-site mixed loading of various explosives can be realized by using the different combinations of the bins and the output pipelines.

The varieties of the explosives mixed loaded by the on-site mixed loading truck for explosives with different detonation velocities of the invention comprise:

Function 1: heavy emulsion explosive: the main helix conveyor A outputs the porous granular ammonium nitrate, the diesel is sprayed into the vertical section of the inclined helix, then the emulsion base and the sensitizing solution are injected into the vertical section of the inclined helix, the materials are mixed by the mixing helix conveyor and then enter the mixing hopper to form the heavy emulsion explosive with the content of porous granular ammonium nitrate (weight ratio) of 10%-49%, the heavy emulsion explosive is injected into the bottom of the blast hole via the product pump, the water ring injector and the main explosive conveying coil, and the accumulated water in the hole is simultaneously drained; and the heavy emulsion explosive is suitable for blasting of hard rocks and water-containing blast holes.

Function 2: density-modifiable heavy emulsion explosive: the main helix conveyor A outputs the porous granular ammonium nitrate, the main helix conveyor B outputs the physical density modifier, the diesel is sprayed into the vertical section of the inclined helix, the emulsion base and the sensitizing solution are injected into the vertical section of the inclined helix, the density-modifiable heavy emulsion explosive is formed after mixing by the mixing helix conveyor, the density-modifiable heavy emulsion explosive enters a product hopper, is injected into the bottom of the blast hole via the product pump, the water ring injector and the main explosive conveying coil, and the accumulated water in the hole is simultaneously drained; and the density-modifiable heavy emulsion explosive is suitable for blasting of water holes below medium hardness.

Function 3: low density emulsion explosive: the main helix conveyor B outputs the physical density modifier, and the emulsion base and the sensitizing solution are simultaneously sprayed into the vertical section of the inclined helix conveyor, mixed by the mixing side helix conveyor, and then sent into the blast hole or are mixed by the mixing side helix conveyor when loaded in the water hole, then enter the product hopper and are injected into the bottom of the blast hole via the product pump, the water ring injector and the main explosive conveying coil. In this function, the low density emulsion explosive can be prepared by modifying the output parameter of the physical density modifier, and the density modification range is 0.4-1.30 $g/cm^3$ to be applicable to changes in different blasting environments, rock hardness and joint development.

Function 4: ultra-low density emulsion explosive: the output parameter of the physical density modifier in the function 3 is increased to improve the content of the physical density modifier in the emulsion explosive and prepare the ultra-low density emulsion explosive. The density-modifiable range is 0.2-0.4 $g/cm^3$, and the ultra-low density emulsion explosive is suitable for pre-splitting blasting and smooth blasting, as well as blasting of soft rocks and extreme joints.

Function 5: heavy ammonium nitrate fuel oil explosive with the weight ratio of porous granular ammonium nitrate fuel oil explosive of more than 50%: the main helix conveyor A conveys porous granular ammonium nitrate material, the diesel is sprayed into the vertical section of the inclined helix conveyor, then the emulsion base and the sensitizing solution are simultaneously sprayed into the vertical section of the inclined helix conveyor, and the heavy ammonium nitrate fuel oil explosive is formed after mixing by the mixing helix conveyor, and sent into the blast hole via the mixing helix conveyor.

The heavy ammonium nitrate fuel oil explosive has certain moisture resistance and water resistance, and is suitable for blasting rocks below medium hardness. Dry holes, moist holes and blast holes containing a small amount of water are applicable to loading the heavy ammonium nitrate fuel oil explosive.

Function 6: density-modifiable heavy ammonium nitrate fuel oil explosive: on the basis of function 5, the physical density modifier is output by the main helix conveyor B to adjust the density of the heavy ammonium nitrate fuel oil explosive. Preferably, the density modification range is 0.45-1.15 $g/cm^3$, and the density-modifiable heavy ammonium nitrate fuel oil explosive is suitable for blasting moist holes, blast holes containing a small amount of water, soft rocks and rocks which relatively developed joints or blasting for different rock properties in the same blast hole.

Function 7: porous granular ammonium nitrate fuel oil explosive: the main helix conveyor A conveys the porous granular ammonium nitrate material, the diesel is sprayed into the vertical section of the inclined helix conveyor, and the porous granular ammonium nitrate fuel oil explosive is formed after mixing and sent into the blast hole via the mixing helix conveyor. The porous granular ammonium nitrate fuel oil explosive is suitable for dry holes, drought regions and environments with water-free operations in winter, and blasting of rocks below medium hardness.

Function 8: density-modifiable porous granular ammonium nitrate fuel oil explosive: on the basis of function 7, the physical density modifier is output by the main helix conveyor B to adjust the density of the porous granular ammonium nitrate fuel oil explosive. The modification range is 0.4-0.9 $g/cm^3$, and the density-modifiable porous granular ammonium nitrate fuel oil explosive is suitable for blasting dry holes, soft rocks and rocks with relatively developed joints.

Function 9: pure emulsion explosive: the emulsion base and the sensitizing solution pass through the auxiliary plunger linkage pump, the water ring injector, the auxiliary explosive conveying coil and the static mixer to prepare and output the pure emulsion explosive, the pure emulsion explosive is output through the small-diameter explosive conveying hose, the distance is 50 m, the farthest distance can achieve 60 m, and when the on-site mixed loading truck can not reach the vicinity of the blast hole, the function is more applicable. The pure emulsion explosive is simultaneously suitable for blasting water holes and blasting hard rocks, when the blast hole is blocked, the small-diameter explosive hose can still load the explosive, the pure emulsion explosive is simultaneously suitable for blasting roots and blasting masses, and the explosive loading is flexible. Compared with a loading system of a large coil machine, the system is a relatively independent system, and the two do not conflict with each other during operations.

The on-site mixed loading truck for explosives with different detonation velocities of the invention is provided with the main explosive conveying coil and the auxiliary explosive conveying coil, wherein the pipe diameter of the auxiliary explosive conveying coil is smaller than that of the main explosive conveying coil, and the pipeline is relatively long, so that the auxiliary explosive conveying coil can output the explosive when the explosive truck is difficult to achieve a position, complete loading under the situation that the little emulsion base remains or on the premise that the main explosive conveying hose can not complete loading, send the explosive to the bottom of the blast hole and flexibly output the emulsion explosive.

The control system of the invention comprises the automobile power takeoff hydraulic oil loop control system, the pump flow control system, the material output control system, the equipment switch control system, the programmable controller, the mixing proportion control system, the electric potential control system, the bulk explosive information processing system, the bulk explosive monitoring system and the control panel. The control system further comprises a temperature and pressure sensor, an ammonium nitrate tachometer, a rotational speed control meter of the emulsion base pump, the rotational speed control meter of the sensitizing solution pump, a water flow control meter of process water, rotor flowmeters of diesel, sensitizing solution and process water, an electronic proportional control valve, a manual material control valve and other control valves and meters, and can precisely display and control the discharge speeds and the flow rates of all the materials and ensure the proportion and the quality of a mixed loaded explosive product by precise measurement; and the stability, safety and reliability in the mixing preparation process and the output process of the explosives are ensured by precise control of the pumps and the helix conveyors.

A plurality of the functions of the on-site mixed loading truck for explosives with different detonation velocities of the invention are described above. Compared with the prior art, the truck has more extensive preparation modes and a wider application range, and has the characteristic of multiple functions in one machine.

DETAILED DESCRIPTION OF THE EMBODIMENTS

The invention is further illustrated in conjunction with the following accompanying drawings.

Figure 1:
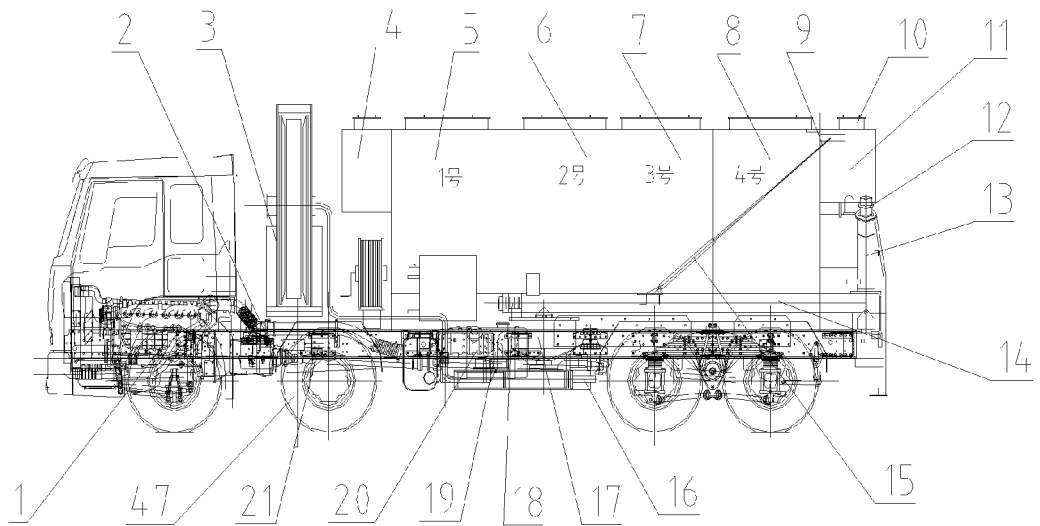
FIG. 1 is a structure diagram of an explosive mixed loading truck of the invention.
Figure 2:
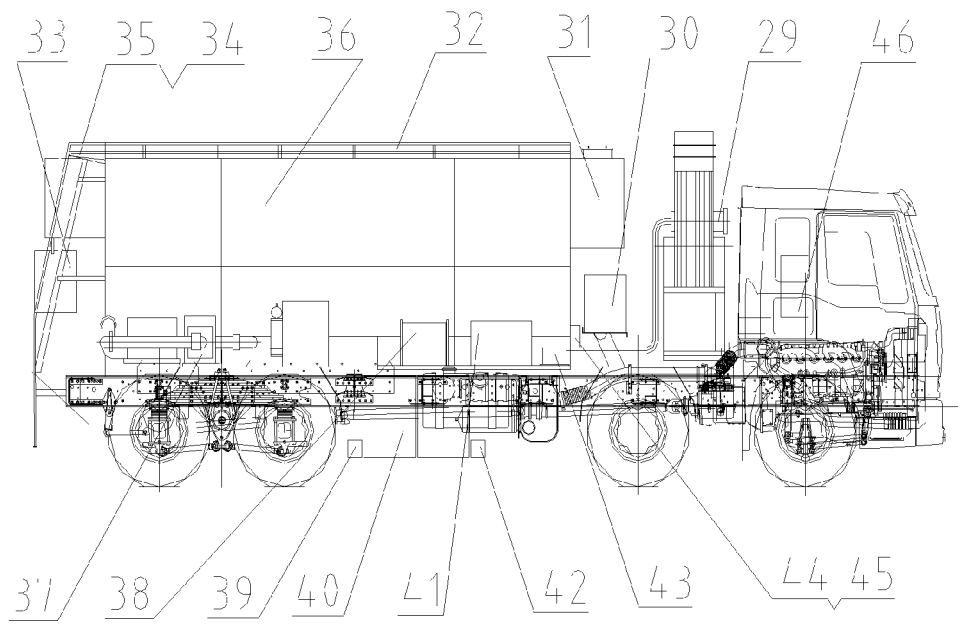
FIG. 2 is a back diagram of the mixed loading truck as shown in FIG. 1.
Figure 3:
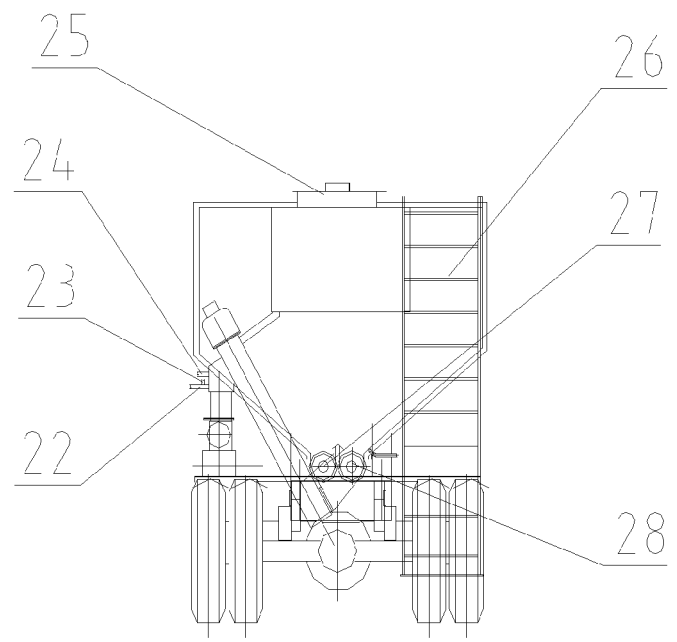
FIG. 3 is a right diagram of the mixed loading truck as shown in FIG. 1.
Figure 4:
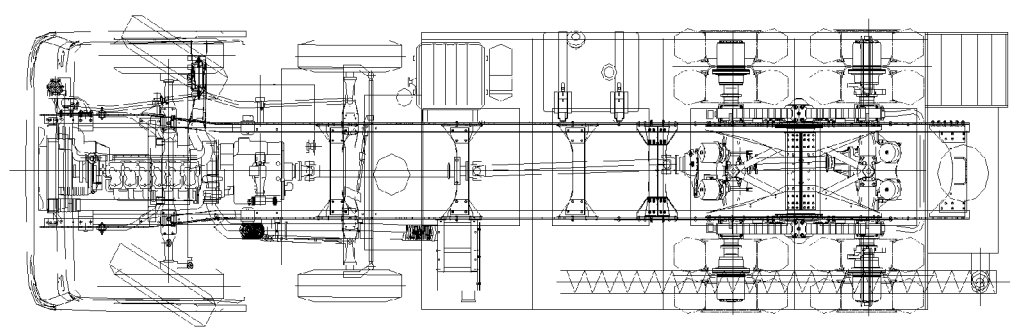
FIG. 4 is a top diagram of the mixed loading truck as shown in FIG. 1.

FIGS. 1, 2, 3 and 4 shows structure diagrams of an embodiment of an explosive mixed loading truck of the invention.

The on-site mixed loading truck for explosives with different detonation velocities shown in the figures comprises:

An automobile truck body and an automobile chassis 1, as well as an automobile power takeoff device 2 connected with an automobile gearbox, wherein the automobile power takeoff device 2 comprises a hydraulic oil pump 21 connected with the automobile gearbox, a hydraulic oil splitter, a hydraulic oil cooler 41, a hydraulic oil cooling pump 43, a hydraulic oil filter and a hydraulic oil tank 30, wherein the hydraulic splitter is used for respectively connecting hydraulic oil produced by a hydraulic pump to different hydraulic pumps and different hydraulic motors to output power, and control elements of hydraulic oil lines are arranged in a control cabinet 33 of the hydraulic system in a centralized manner.

The bin part comprises a bin 5, a bin 6, a bin 7 and a bin 8, the above bins can respectively accommodate porous granular ammonium nitrate, a physical density modifier and an emulsion base according to actual blasting conditions, a bin top cover 25 is arranged on each bin, a heat insulation layer 36 is arranged on the outer wall or the inner wall of each bin, and the bin part further comprises a sensitizing solution tank 40, a washing water tank 11, a diesel tank 4, a diesel tank 31 and a water tank cover 10.

A boom 9 is arranged on one side of the washing water tank 11, and the boom 9 is driven by a boom hydraulic cylinder 15.

Washing water in the washing water tank 11 is pumped out by a washing water pump 19.

A conveying and mixing part comprises main helix conveyors 27 and a main helix conveyor 28, wherein the main helix conveyor 27 and the main helix conveyor 28 are respectively connected with the bottom parts of the bin 5, the bin 6, the bin 7 and the bin 8; baffle plates are arranged at the joints; and the baffle plates can be controlled manually to open or controlled by an electrical control system 46 to open.

The main helix conveyor 27 and the main helix conveyor 28 are arranged in parallel, and the outlet ends thereof are sequentially connected with an inclined helix conveyor 13 and a mixing helix conveyor 14, wherein vertical sections are respectively arranged at the front end and the back end of the inclined helix conveyor 13. An outlet end of the mixing helix conveyor 14 is connected with a mixing hopper 17; a mixing device is arranged in the mixing hopper 17, and an outlet thereof is connected with a main explosive conveying coil 3; a product after mixing is pumped into a blast hole by a product pump 16, and a terminal 47 of the main explosive conveying coil 3 can send a finally generated explosive into the bottom of the blast hole.

The main helix conveyor 27 is driven by a hydraulic motor 44, the main helix conveyor 28 is driven by a hydraulic motor 45, the inclined helix conveyor 13 is driven by a hydraulic motor 12, the mixing helix conveyor 14 is driven by a hydraulic motor 18, the main explosive conveying coil 3 is driven by the hydraulic motor 29, all the hydraulic motors are connected with the hydraulic splitter for inputting the power, the hydraulic oil splitter is connected with the hydraulic pump, the hydraulic pump is connected with a transmission rod, the transmission rod is connected with the automobile power takeoff device 2, and the automobile power takeoff device 2 is connected with the automobile gearbox for obtaining a power source.

In this case, an emulsion base screw pump 37 is arranged at the outlet end of an output pipe of the bin accommodating the emulsion base, the sensitizing solution tank 40 is provided with a sensitizing solution pump 39 and a sensitizing solution pump 42, the emulsion base pump 37 and the sensitizing solution pump 39 comprise two pipelines: one line is connected to the vertical section of the inclined helix conveyor 13 through a pipeline and a spout and respectively connected with a base injection port 22 and a sensitizing solution injection port 23; and the other line is directly connected with a base plunger pump, a water ring injector, an auxiliary explosive conveying coil 4 and a static mixer, wherein the sensitizing solution pumps are driven by a 24V direct current motor.

The diesel tank 4 is provided with a diesel pump 20, and the diesel pump 20 is connected with a diesel injection port 24 at the upper end of the vertical section at the outlet end of the inclined helix conveyor 13 through a pipeline and a spout to output and spray diesel to be mixed with porous granular ammonium nitrate.

In order to facilitate maintenance and operation, a toolbox 38, a walkway and a walkway guardrail 32 are arranged on the truck body, and the walkway is provided with a ladder 26 for enabling staff to go up and down, and further comprises a guardrail lifting cylinder 34 and a pneumatic system 35.

The implementation ways of the explosive mixed loading truck of the invention are described in conjunction with the following different functions of the on-site mixed loading truck for explosives with different detonation velocities.

Function 1: Heavy Emulsion Explosive

The emulsion base is loaded into the bin 7 and the bin 8, and the porous granular ammonium nitrate is loaded into the bin 5 and the bin 6, wherein the porous granular ammonium nitrate is output by the main helix conveyor 27, the diesel is pumped out by the diesel pump and sprayed into the vertical section at the outlet end of the inclined helix conveyor 13 to mix with the porous granular ammonium nitrate to form an ammonium nitrate fuel oil explosive, and the emulsion base is pumped out by the emulsion base screw pump, sprayed into the vertical section of the inclined helix conveyor 13 to mix with the ammonium nitrate fuel oil explosive in the mixing helix conveyor 14 and directly sent into the blast hole via the mixing helix conveyor 14. The heavy emulsion explosive prepared by the implementation way is suitable for dry blast holes or moist blast holes; and the heavy emulsion explosive can also be sent into the mixing hopper 17 via the mixing helix conveyor 14, then pass through the water ring injector and enter the blast hole via the main explosive conveying coil 3 along with a water ring. The heavy emulsion explosive prepared by the implementation way is suitable for water-containing blast holes.

In the implementation way, the content (weight ratio) of the porous granular ammonium nitrate in the prepared heavy emulsion explosive is 10%-49%, preferably 10%, 30% and 45%.

Function 2: Density-Modifiable Heavy Emulsion Explosive

The emulsion base is loaded into the bin 7 and the bin 8, and the porous granular ammonium nitrate and the physical density modifier are respectively loaded into the bins 5 and 6, wherein the main helix conveyor 27 outputs the porous granular ammonium nitrate, the main helix conveyor 28 outputs the physical density modifier, the diesel is sprayed into the vertical section at the outlet end of the inclined helix conveyor 13, and the emulsion base is pumped out by the emulsion base screw pump, sprayed into the vertical section of the inclined helix conveyor 13 along with a sensitizing solution, mixed by the mixing helix conveyor 14 and directly sent into the blast hole via the mixing helix conveyor 14. The density-modifiable heavy emulsion explosive prepared by the implementation way is suitable for dry blast holes or moist blast holes of slightly soft rocks; and the density-modifiable heavy emulsion explosive can also be sent into the mixing hopper 17 by the mixing helix conveyor 14, then pass through the water ring injector and be sent into the blast hole via the main explosive conveying coil 3 along with the water ring. The density-modifiable heavy emulsion explosive prepared by the implementation way is suitable for water-containing blast holes of the slightly soft rocks.

The density-modifiable heavy emulsion explosive prepared by the implementation way has the density of 0.6-1.2 g/cm$^3$ and is suitable for blasting for different rock properties.

Function 3: Low Density Emulsion Explosive

The emulsion base is loaded into the bin 7 and the bin 8, pumped out by the emulsion base screw pump and sprayed into the mixing helix conveyor 14 along with the sensitizing solution, and the physical density modifier is loaded into the bin 5 and the bin 6, output by the main helix conveyor 28, mixed with the emulsion base in the mixing helix conveyor 14 and then sent into the blast hole by the main explosive conveying coil 3.

The low density emulsion explosive produced by using the implementation way has the density of 0.3-1.2 g/cm$^3$ and relatively good water resistance and is suitable for blasting water holes; and furthermore, as the density is lower, the low density emulsion explosive is particularly suitable for pre-splitting blasting or blasting rocks with severe degree of weathering.

Function 4: Ultra-Low Density Emulsion Explosive

The emulsion base is loaded into the bin 7 or 8, and the physical density modifier is loaded into other bins. Being the same with the process flow of the low density emulsion explosive, the emulsion base is pumped out by the emulsion base screw pump and sprayed into the vertical section of the inclined helix conveyor 13 along with the sensitizing solution, and the physical density modifier is output by the main helix conveyor 28, mixed with the emulsion base in the mixing helix conveyor 14 and then sent into the blast hole via the main explosive conveying coil 3.

The ultra-low density emulsion explosive produced by using the implementation way has the density of less than 0.3 g/cm$^3$ and is only suitable for pre-splitting blasting or smooth blasting.

According to the implementation way, the emulsion base can be loaded into the bins 7 and 8, the physical density modifier can be loaded into the bin 5 and the bin 6, the rotational speed is output through the main helix conveyor 28, and then the ultra-low density emulsion explosive is further produced.

Function 5: Heavy Ammonium Nitrate Fuel Oil Explosive

The emulsion base is loaded into the bin 7 and the bin 8, and the porous granular ammonium nitrate is loaded into the bin 5 and the bin 6, wherein the porous granular ammonium nitrate is output by the main helix conveyor 27, the diesel is sprayed in at the upper end of the vertical section at the outlet end of the inclined helix conveyor 13, and the emulsion base is pumped out by the emulsion base screw pump, sprayed into the vertical section of the inclined helix conveyor 13 along with the sensitizing solution, mixed by the mixing helix conveyor 14, then enter a product hopper and is further sent into the blast hole via the product pump, the water ring injector and the main explosive conveying coil 3. When in operations in dry holes and moist holes, the emulsion base is directly sent into the blast hole via the mixing helix conveyor 14.

By adopting the implementation way, the sensitizing solution is added before the base is added into the mixing helix conveyor 14.

By adopting the implementation way, the heavy ammonium nitrate fuel oil explosive with the different contents of the emulsion base can be prepared by regulating the rotational speed of the main helix conveyor 27.

In the heavy ammonium nitrate fuel oil explosive, the weight ratio of the emulsion base to the porous granular ammonium nitrate fuel oil explosive is 10-49%, preferably, the content (weight ratio) of the emulsion base is 10%, and the explosive is characterized by moisture resistance; the content (weight ratio) of the emulsion base is 30%, and the explosive is characterized by moisture resistance and certain water resistance, and is suitable for blasting medium-hardness rocks; and the content (weight ratio) of the emulsion base is 45%, and the explosive is characterized by relatively good water resistance and suitable for blasting rocks of medium hardness or above medium hardness.

Function 6: Density-Modifiable Heavy Ammonium Nitrate Fuel Oil Explosive

The emulsion base is loaded into the bin 7 and the bin 8, the porous granular ammonium nitrate is loaded into the bin 5, the physical density modifier is loaded into the bin 6, the emulsion base and the physical density modifier can also be respectively loaded into the bins 7 and 8, the porous granular ammonium nitrate is loaded into the bin 6 and the bin 5, and the difference with the heavy ammonium nitrate fuel oil explosive is that, in the implementation way, the physical density modifier is simultaneously output by the main helix conveyor 28 and mixed in the inclined helix conveyor 13, then the diesel is firstly sprayed in, and then the emulsion base and the sensitizing solution are sprayed in. In the implementation way, the output speed of the physical density modifier can be regulated to correspondingly adjust the density of the heavy ammonium nitrate fuel oil explosive, wherein, the weight ratio of the emulsion base to the sensitizing solution is preferably 100: (1-3), and the explosive is characterized by moisture resistance and certain water resistance and suitable for blasting rocks of medium hardness and above medium hardness; and furthermore, the density of the explosive can be adjusted according to different blasting construction environments.

Function 7: Porous Granular Ammonium Nitrate Fuel Oil Explosive

The porous granular ammonium nitrate is loaded into one or more of the bin 5, the bin 6, the bin 7 and the bin 8 and output by the main helix conveyor 27, the diesel is sprayed in at the vertical section at the outlet end of the inclined helix conveyor 13, and the materials are mixed by the mixing helix conveyor 14 and then sent into the blast hole.

In this case, the bin 7 and the bin 8 loading the emulsion base, need to close emulsion base outlets, and the baffle plates are mounted in the bins at the upper part of the main helix conveyor to guide the porous granular ammonium nitrate to flow to the main helix conveyor 13.

In this case, the weight ratio of the porous granular ammonium nitrate to the diesel is preferably 94.5:5.5. The explosive is suitable for dry hole blasting, frozen soil blasting and water-free blast hole blasting operations.

Function 8: Density-Modifiable Porous Granular Ammonium Nitrate Fuel Oil Explosive The porous granular ammonium nitrate and the physical density modifier are respectively loaded into the bin 5, the bin 6, the bin 7 and the bin 8. The difference with the porous granular ammonium nitrate fuel oil explosive is that, in the implementation way, the physical density modifier is simultaneously output by the main helix conveyor 28, the diesel is sprayed in at the vertical section at the outlet end of the inclined helix conveyor 13, and the materials are mixed by the mixing helix conveyor 14 and then sent into the blast hole.

In the implementation way, the density of the porous granular ammonium nitrate fuel oil explosive is correspondingly adjusted by regulating the output speed of the physical density modifier.

It is noted that, if the output of the physical density modifier is too large, the performances of the porous granular ammonium nitrate fuel oil explosive will be unstable, and the density range of the ammonium nitrate fuel oil explosive is 0.5-0.9 $g/cm^3$, preferably 0.7, 0.8 and 0.9.

Function 9: Pure Emulsion Explosive

The emulsion base is loaded into the bin 7 and the bin 8, the emulsion base and the sensitizing solution are pumped out by an emulsion base auxiliary plunger linkage pump, an emulsion base explosive column is output by the water ring injector and enters the auxiliary explosive conveying coil 4, the emulsion base explosive column is wrapped with a sensitizing solution water ring, the outlet of the auxiliary explosive conveying coil 4 is connected with the static mixer, the emulsion base explosive column and the sensitizing solution water ring are mixed in a fast and static manner and sent into the blast hole for 15-20 min so as to be sensitized become the explosive, and the pure emulsion explosive is suitable for 50 m long-distance transportation, blasting in blasting operation regions which the explosive trucks can not arrive and blasting when the blast holes are blocked.

The conventional pure emulsion explosive is produced by the implementation way, but the density adjustment is only limited to chemical sensitization, and the adjustment range is 1.00-1.30 $g/cm^3$.

In the equipment of the invention, obviously, all the parts can be decomposed, combined and/or re-combined after decomposition. The decompositions and/or re-combinations should be considered as the equivalents of the invention. Simultaneously, in the above description of the specific embodiments of the invention, the description and/or the features for one implementation way can be used in one or more of other implementation ways in the same or similar way and combined with the features in other implementation ways or used for replacing the features in other implementation ways.

The invention claimed is:

1. An on-site truck for mixing and loading explosives with different detonation velocities, comprising a truck body and a chassis, characterized by further comprising a main bin system, an auxiliary bin system, a double-helix conveying and mixing system and a control system, as well as a main explosive conveying coil, an auxiliary plunger linkage pump and an auxiliary explosive conveying coil, wherein the main bin system comprises an emulsion base bin, an ammonium nitrate bin and a physical density modifier bin; the auxiliary bin system comprises diesel tanks and a sensitizing solution tank; the diesel tanks are provided with diesel pumps; the emulsion base bin is provided with an emulsion base pump; the sensitizing solution tank is provided with a sensitizing solution pump; the double-helix conveying and mixing system comprises main helix conveyors, an inclined helix conveyor and a mixing side helix conveyor, which are sequentially arranged; the main helix conveyors at least include a main helix conveyors A and a main helix conveyor B; an inlet end of the main helix conveyor A is connected with the bottom of the ammonium nitrate bin, and an inlet end of the main helix conveyor B is connected with the bottom of the density modifier bin; the main helix conveyor A and the main helix conveyor B are connected with the inclined helix conveyor, the mixing side helix conveyor and a mixing hopper successively; an outlet end of the mixing side helix conveyor is directly sequentially connected with the mixing hopper; and an outlet end of the mixing hopper is connected with a product pump, a water ring injection device and the main explosive conveying coil.

2. The on-site truck for mixing and loading explosives with different detonation velocities according to claim 1, characterized in that the main helix conveyor A and the main helix conveyor B are both mounted below a material tank of the mixed loading truck and used for respectively conveying porous granular ammonium nitrate and/or a density modifier.

3. The on-site truck for mixing and loading explosives with different detonation velocities according to claim 2, characterized in that the main helix conveyor B is provided with a speed regulating device, by means of which the rotational speed of the main helix conveyor B is regulated, and in turn the output speed of the physical density modifier is regulated, to achieve the purpose of modifying different densities.

4. The on-site truck for mixing and loading explosives with different detonation velocities according to claim 1, characterized in that baffle plates for controlling the bins to discharge or not to discharge are arranged at the joints of the emulsion base bin, the ammonium nitrate bin and the density modifier bin with the main helix conveyor, and opening of each baffle plate is controlled manually or controlled through the control system.

5. The on-site truck for mixing and loading explosives with different detonation velocities according to claim 1, characterized in that the baffle plates are material flow direction baffle plates for controlling materials to respectively flow to a main material conveying helix A or B.

6. The on-site truck for mixing and loading explosives with different detonation velocities according to claim 1, characterized in that the emulsion base bin is used for storing and loading the ammonium nitrate or the density modifier, and controlling the two materials to flow to the respective material conveying helixes through the material flow direction baffle plates mounted at the bottom, in producing an ammonium nitrate fuel oil explosive or a density-modifiable ammonium nitrate fuel oil explosive.

7. The on-site truck for mixing and loading explosives with different detonation velocities according to claim 1, characterized in that output pipelines of an emulsion base and a sensitizing solution comprise the two lines: one line comprises the auxiliary plunger linkage pump, a water ring injector, the auxiliary explosive conveying coil and a static mixer, which are sequentially connected; and the other line comprises an emulsion base screw pump for pumping the emulsion base and the sensitizing solution pump; the emulsion base screw pump and the sensitizing solution pump are respectively connected with the lower end of a vertical outlet section of the inclined helix conveyor through pipelines; the sensitizing solution tank at least comprises three relatively independent sensitizing solution tanks for respectively providing different concentrations of sensitizing solution, and one or two of the sensitizing solution tanks is/are used for providing the sensitizing solution through the auxiliary plunger linkage pump.

8. The on-site truck for mixing and loading explosives with different detonation velocities according to claim 1, characterized in that the on-site truck for mixing and loading explosives is further provided with a power takeoff hydraulic oil loop control system, which comprises a power takeoff connected with a gearbox of the truck body, a transmission rod, a hydraulic pump, a hydraulic oil splitter, a hydraulic oil cooler, a hydraulic oil filter, a hydraulic oil tank, a pressure gauge, a thermometer, a hydraulic pipeline and other hydraulic system components.

9. The on-site truck for mixing and loading explosives with different detonation velocities according to claim 1, characterized in that the diesel tanks and the output pipelines are connected with the upper end of the vertical outlet section of the inclined helix conveyor through pipelines and spouts.

10. The on-site truck for mixing and loading explosives with different detonation velocities according to claim 1, characterized in that a vertical helix conveying section/sections is/are arranged at one end or two ends of the inclined helix conveyor.

11. The on-site truck for mixing and loading explosives with different detonation velocities according to claim 1, characterized in that the control system comprises an automobile power takeoff hydraulic oil loop control system, a pump flow control system, a material output control system, an equipment switch control system, a programmable controller, a mixing proportion control system, an electric potential control system, a bulk explosive information processing system, a bulk explosive monitoring system and a control panel.

12. The on-site truck for mixing and loading explosives with different detonation velocities according to claim 1, characterized in that heat insulation layers/a heat insulation layer are/is arranged on the inner side and/or the outer side of the wall of the emulsion base bin.

13. The on-site truck for mixing and loading explosives with different detonation velocities according to any of claims 1, characterized in that the on-site truck for mixing and loading explosives further comprises a process water and washing water system, and the process water and washing water system comprises a water tank and a water pump.

14. The on-site truck for mixing and loading explosives with different detonation velocities according to claim 1, characterized in that the mixing hopper is a temporary storage tank which is used before the explosives are loaded to the bottom of a blast hole in production of a heavy emulsion explosive or a low density emulsion explosive, and the stored explosives are pumped through the product pump and further loaded to the bottom of the blast hole through the water ring injection device and the main explosive conveying coil.

15. The on-site truck for mixing and loading explosives with different detonation velocities according to claim 1, characterized in that the mixing side helix conveyor rotates horizontally, an explosive product after mixing is directly loaded into the blast hole, and the mixing side helix conveyor is mounted on one side of a driver or at the top of a compartment.

* * * * *